US008626773B2

(12) United States Patent
Woody et al.

(10) Patent No.: US 8,626,773 B2
(45) Date of Patent: Jan. 7, 2014

(54) ALIGNING RECORDS FOR VISUAL COMPARISON

(75) Inventors: Jeffrey Woody, Onalaska, WI (US); Prasanthi Thatavarthy, Onalaska, WI (US)

(73) Assignee: Business Objects Software Limited, Dublin (IE)

( * ) Notice: Subject to any disclaimer, the term of this patent is extended or adjusted under 35 U.S.C. 154(b) by 13 days.

(21) Appl. No.: 13/316,633

(22) Filed: Dec. 12, 2011

(65) Prior Publication Data

US 2013/0151537 A1 Jun. 13, 2013

(51) Int. Cl.
G06F 17/30 (2006.01)
(52) U.S. Cl.
USPC .......................................... 707/748
(58) Field of Classification Search
USPC .......................................... 707/748
See application file for complete search history.

(56) References Cited

U.S. PATENT DOCUMENTS

| | | | | |
|---|---|---|---|---|
| 6,374,241 | B1* | 4/2002 | Lamburt et al. | 1/1 |
| 6,990,480 | B1* | 1/2006 | Burt | 1/1 |
| 2003/0167253 | A1* | 9/2003 | Meinig | 707/1 |
| 2005/0086256 | A1* | 4/2005 | Owens et al. | 707/103 R |
| 2006/0095373 | A1* | 5/2006 | Venkatasubramanian et al. | 705/40 |
| 2012/0023107 | A1* | 1/2012 | Nachnani et al. | 707/748 |

OTHER PUBLICATIONS

Griethe, H. and Schumann, H; The visualization of uncertain data: Methods and problems; Proceedings of SimVis—vol. 6; 2006; DBLP, University of Trier, Trier, Germany; (http://www.informatik.uni-rostock.de/~schumann/papers/2006%2B/Magdeburg_griethe.pdf).

William E Winkler; Overview of record linkage and current research directions; Research Report Series; 2006; Statistical Research Division, U.S. Census Bureau, Washington, DC, USA; (http://www.census.gov/srd/papers/pdf/rrs2006-02.pdf).

Rajmonda Sulo, Stephen Eick and Robert Grossman; DaVis: A tool for Visualizing Data Quality; Posters Compendium of InfoVis; 2005; IEEE Explore, NY, USA; (http://pubs.rgrossman.com/dl/proc-095.pdf).

Carlo Batini and Monica Scannapieco; Data Quality: Concepts, Methodologies and Techniques; p. 113; 2006; Springer-Verlag New York, Inc. Secaucus, NJ, USA; (http://www.springer.com/computer/database+management+%26+information+retrieval/book/978-3-540-33172-8).

Hyunmo Kang; Duplicate search and visualization of cluster-wise relational context for entity resolution; Accessed on Dec. 7, 2011; Department of Computer Science, University of Maryland, College Park, MD, USA (http://www.cs.umd.edu/projects/linqs/ddupe).

(Continued)

*Primary Examiner* — Truong Vo
*Assistant Examiner* — Courtney Harmon

(57) ABSTRACT

Various embodiments of systems and methods for aligning records for visual comparison are described herein. In one aspect, the method includes identifying a plurality of records. A reference record is selected from the plurality of records. One or more non-reference record is merged into the reference record to generate a merged reference record. The merged reference record includes one or more fields missing in the reference record. The missing fields are included as blank fields from the non-reference records. The merged reference record is merged into a non-reference record to generate the merged non-reference record. The merged non-reference record includes fields missing in the non-reference record. Missing fields are included as blank fields. The merged records are displayed on a user interface in a card view.

17 Claims, 12 Drawing Sheets

(56) References Cited

OTHER PUBLICATIONS

Hyunmo Kang, Lise Getoor, Ben Shneiderman, Mustafa Bilgic and Louis Licamele; Interactive Entity Resolution in Relational Data: A Visual Analytic Tool and Its Evaluation; IEEE Transactions on Visualization and Computer Graphics, vol. 14, No. 5, Sep./Oct. 2008; IEEE Explore, NY, USA; (http://ieeexplore.ieee.org/xpl/freeabs_all.jsp?arnumber=4479458).

* cited by examiner

| RECORD COMPARISON | RECORD: 101 (LEFT CARD) | RECORD: 102 (RIGHT RECORD) |
|---|---|---|
| COLUMN NAME | MATCH_SCORE: | MATCH_SCORE: 61 |
| CUSTOMER | ▣☐ CUSTOMER | ▣☐ CUSTOMER |
| FIRST NAME | XYZ 101A | XYZ 102A |
| LAST NAME | ABC 101C | PQR1 102B |
| REGION | NORTH 101R | ABC1 102C |
| MASKED | ****** 101M | NORTH 102R** |
| | | ****** 102M** |
| ADDRESS | ▣☐ ADDRESS 1 | ▣☐ ADDRESS 1 |
| STREET | MAIN S | MAIN |
| HOUSE NUM. | 457 | 456 |
| CITY | NEWYORK | NEWYORK |
| POSTAL CODE | 82345 | 08234 |
| REGION | NY | NY |
| COUNTRY | USA | USA |
| ADDRESS | ▣☐ ADDRESS 2 | ▣☐ ADDRESS USAGE 102H1 |
| STREET | NARROW | SHIPPING |
| HOUSE NUM. | 23 | BILLING |
| CITY | MIAMI | ▣☐ LEVEL 4 102H2 |
| POSTAL CODE | 34567 | SOME VALUE |
| REGION | FL | |
| COUNTRY | USA | |
| TELEPHONE | 920-207-5248 | 608-498-4018 |
| FAX | 212-321-7645 | |
| EMAIL | XYZ@GMAIL.COM | XYZ1@HOTMAIL.COM |

FIG. 1 (PRIOR ART)

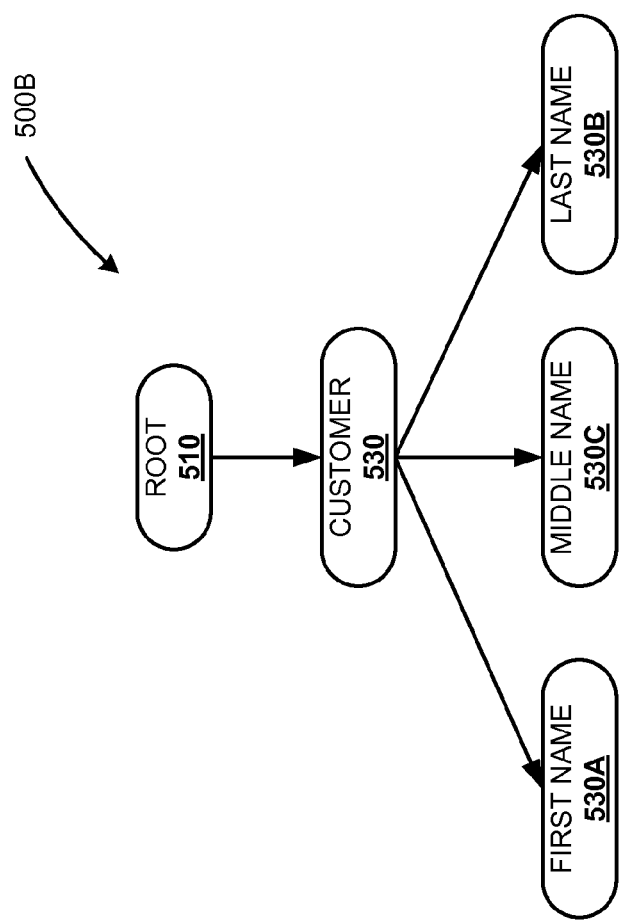
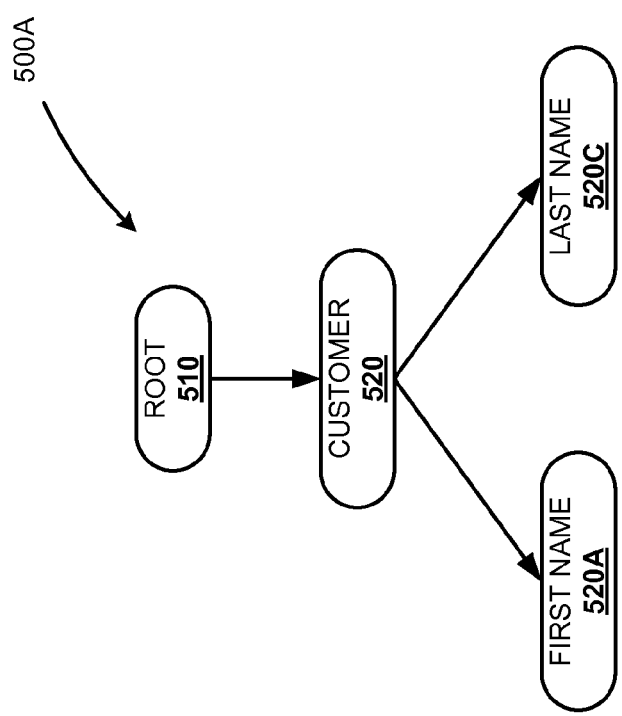
FIG. 5

| RECORD: 600A | |
|---|---|
| CUSTOMER | ▣ ☐ CUSTOMER |
| FIRST NAME | XYZ 610A |
| LAST NAME | ABC 610C |
| REGION | NORTH |
| MASKED | ********** |
| ADDRESS | ▣ ☐ ADDRESS |
| STREET | MAIN S |
| HOUSE NUM. | 457 |
| CITY | NEWYORK |
| POSTAL CODE | 82345 |
| REGION | NY |
| COUNTRY | USA |
| TELEPHONE | 920-207-5248 610T |
| FAX | 212-321-7645 610F |
| EMAIL | XYZ@GMAIL.COM 610E |

| RECORD: 600B | |
|---|---|
| | ▣ ☐ CUSTOMER |
| | XYZ 620A |
| | PQR1 620B |
| | ABC1 620C |
| | NORTH |
| | ********** |
| | ▣ ☐ ADDRESS |
| | MAIN |
| | 456 |
| | NEWYORK |
| | 08234 |
| | NY |
| | USA |
| | ▣ ☐ ADDRESS USAGE 620H1 |
| | SHIPPING 620H11 |
| | BILLING 620H12 |
| | ▣ ☐ LEVEL 4 620H2 |
| | SOME VALUE 620H21 |

FIG. 6

| COLUMN NAME | MATCH_SCORE: | RECORD: 700 |
|---|---|---|
| CUSTOMER | | |
| FIRST NAME | XYZ 610A | |
| MISSING | 610B | |
| LAST NAME | ABC 610C | |
| REGION | NORTH | |
| MASKED | ******** | |
| ADDRESS | ADDRESS | |
| STREET | MAIN S | |
| HOUSE NUM. | 457 | |
| CITY | NEWYORK | |
| POSTAL CODE | 82345 | |
| REGION | NY | |
| COUNTRY | USA | |
| MISSING | 620H1 | |
| MISSING | 620H11 | |
| MISSING | 620H12 | |
| MISSING | 620H2 | |
| MISSING | 620H21 | |
| TELEPHONE | 920-207-5248 610T | |
| FAX | 212-321-7645 610F | |
| EMAIL | XYZ@GMAIL.COM 610E | |

FIG. 7

USER INTERFACE 350

| RECORD COMPARISON | RECORD: 700 | | RECORD: 800 | |
|---|---|---|---|---|
| TITLE COLUMN 810 | MATCH_SCORE: | SUSPECT: | MATCH_SCORE: 61 | SUSPECT: YES |
| CUSTOMER | ☐ CUSTOMER | | ☐ CUSTOMER | |
| FIRST NAME | XYZ 610A | | XYZ 620A | |
| MIDDLE NAME | 620B | | PQR1 620B | |
| LAST NAME | ABC 610C | | ABC1 620C | |
| REGION | NORTH | | NORTH | |
| MASKED | ******** | | ******** | |
| ADDRESS | ☐ ADDRESS | | ☐ ADDRESS | |
| STREET | MAIN S | | MAIN | |
| HOUSE NUM. | 457 | | 456 | |
| CITY | NEWYORK | | NEWYORK | |
| POSTAL CODE | 82345 | | 08234 | |
| REGION | NY | | NY | |
| COUNTRY | 710A — USA | | USA | |
| ADDRESS USES | ☐ 620H1 | | ☐ ADDRESS USAGE 620H1 | |
| TYPE | 620H11 | | SHIPPING 620H11 | |
| TYPE | 620H12 | | BILLING 620H12 | |
| LEVEL 4 | 710B — 620H2 | | ☐ LEVEL 4 620H2 | |
| SOME NAME | 620H21 | | SOME VALUE 620H21 | |
| TELEPHONE | 920-207-5248 610T | | 610T | |
| FAX | 212-321-7645 610F | | 610F | |
| EMAIL | XYZ@GMAIL.COM 610E | | 610E | |

FIG. 8

| RECORD COMPARISON | | RECORD: 700 | RECORD: 800 | |
|---|---|---|---|---|
| TITLE COLUMN 810 | MATCH_SCORE 920A: | SUSPECT: | MATCH_SCORE 920B: 61 | SUSPECT 930: YES |
| CUSTOMER | ▫ ☐ CUSTOMER | | ▫ ☐ CUSTOMER | |
| FIRST NAME | XYZ 610A | • | XYZ 620A | |
| MIDDLE NAME | 620B | ☒ | PQR1 620B | |
| LAST NAME | ABC 610C | ☒ | ABC1 620C | |
| REGION | NORTH | • | NORTH | |
| MASKED | ******** | • | ******** | |
| ADDRESS | ▫ ☐ ADDRESS | ☒ | ▫ ☐ ADDRESS | |
| STREET | MAIN S | ☒ | MAIN | |
| HOUSE NUM. | 457 | • | 456 | |
| CITY | NEWYORK | ☒ | NEWYORK | |
| POSTAL CODE | 82345 | • | 08234 | |
| REGION | NY | | NY | |
| COUNTRY | USA | ☒ | USA | |
| ADDRESS USES | 710A ▫ ☐ | | ▫ ☐ ADDRESS USAGE 620H1 | |
| TYPE | 620H11 | | SHIPPING 620H11 | |
| TYPE | 710B ▫ ☐ 620H12 | ☒ | BILLING 620H12 | |
| LEVEL 4 | 620H2 | | ▫ ☐ LEVEL 4 620H2 | |
| SOME NAME | 620H21 | ☒ | SOME VALUE 620H21 | |
| TELEPHONE | 920-207-5248 610T | | 610T | |
| FAX | 212-321-7645 610F | | 610F | |
| EMAIL | XYZ@GMAIL.COM 610E | ☒ | 610E | |

USER INTERFACE 350

ALIGNING RECORDS FOR VISUAL COMPARISON

BACKGROUND

A record is a data structure for storing information related to an entity. The record comprises various data related to the entity. For example, the record for a customer may comprise data, e.g., a name of the customer, an official address of the customer, a residential address of the customer, a contact number of the customer, etc. It may be required to compare multiple records. For example, it may be required to compare the record of a customer 'xyz' and a customer 'pqr.' A visual comparison may be preferable or needed.

However, it may be difficult to compare the records if the records are placed one on the top of another with data of the records being displayed horizontally. Typically, if the data of the records are displayed horizontally and the records include many data then a user may need to scroll back-and-forth or up-and-down across the records to compare various data which might be inconvenient and time consuming. The records may be placed side-by-side in a vertical arrangement (e.g., in a card view) to obviate the above-mentioned problems. However, even if the records are placed side-by-side, like data of the records may not be in alignment. For example, the 'residential address' of the customer 'xyz' and the 'residential address' of the customer 'pqr' may not be in alignment or may not line up in a same row.

FIG. 1 illustrates some examples that may cause misalignment of the like data of the records, e.g., the misalignment of the like data of a record 101 (i.e., left card) and a record 102 (i.e., right card). Consider three cases.

Case 1: The record 101 includes a first name 101A and a last name 101C of the customer, while the record 102 includes a first name 102A, a middle name 102B, and a last name 102C of the customer. Therefore, the record 102 includes an additional field 102B (e.g., middle name) that is missing in the record 101 and it causes misalignment. Typically, due to misalignment the data (rows) of the record 101 and the corresponding data of the record 102 do not line up. For example, a 'REGION' data 101R and a 'MASKED' data 101M of the record 101 and the corresponding 'REGION' data 102R and the 'MASKED' data 102M of the record 102 do not line up in the same TOW.

Case 2: The record 101 may include two addresses, e.g., ADDRESS 1 and ADDRESS 2 whereas the record 102 may only include one address, e.g., ADDRESS 1 that can also cause misalignment.

Case 3: The data, e.g., ADDRESS 1 of the record 102 may include two levels of hierarchy (102H1 and 102H2) compared to the corresponding ADDRESS 1 of the record 101 that may also cause misalignment.

Misalignment may cause inconvenience when comparing the records as the like data of the records do not line up in the same row. Further, comparing the misaligned records (e.g., the record 101 and 102) may be time consuming.

SUMMARY OF THE INVENTION

Various embodiments of systems and methods for aligning records for visual comparison are described herein. In one aspect, the method executed by one or more computers in a network of computers includes identifying a plurality of records, selecting a reference record from the plurality of records, and merging one or more non-reference record into the reference record to generate a merged reference record. The merged reference record includes one or more fields that are missing in the reference record. The missing fields are included as blank fields from the one or more non-reference records. The merged reference record is merged into a non-reference record to generate a merged non-reference record. The merged non-reference record includes one or more fields missing in the non-reference record. The fields are included as blank fields from the merged reference record. A position or order of an included blank field is determined based upon the corresponding order or position of the field in the merged reference record. The merged reference record and the merged non-reference records are, therefore, aligned relative to each other. The merged records are displayed on a user interface in a card view. Displaying merged records (i.e., aligned records) in the card view enable a user to efficiently and conveniently compare the merged records.

These and other benefits and features of embodiments of the invention will be apparent upon consideration of the following detailed description of preferred embodiments thereof, presented in connection with the following drawings.

BRIEF DESCRIPTION OF THE DRAWINGS

The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 1 is a block diagram of a prior art illustrating two records placed side-by-side in a card view for comparison.

FIG. 5 illustrates tree structures corresponding to exemplary hierarchical records, according to an embodiment of the invention.

FIG. 6 illustrates exemplary records required to be aligned, according to an embodiment of the invention.

FIG. 7 illustrates a merged record generated by merging a second record of FIG. 6 into a first record of FIG. 6, according to an embodiment of the invention.

FIG. 8 is a screen display of the records of FIG. 6 after alignment in a card view, according to an embodiment of the invention.

FIG. 9 illustrates the aligned records of FIG. 8 including several user interface (UI) enhancements to facilitate comparison, according to an embodiment of the invention.

DETAILED DESCRIPTION

Embodiments of techniques for aligning records for visual comparison are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 2:
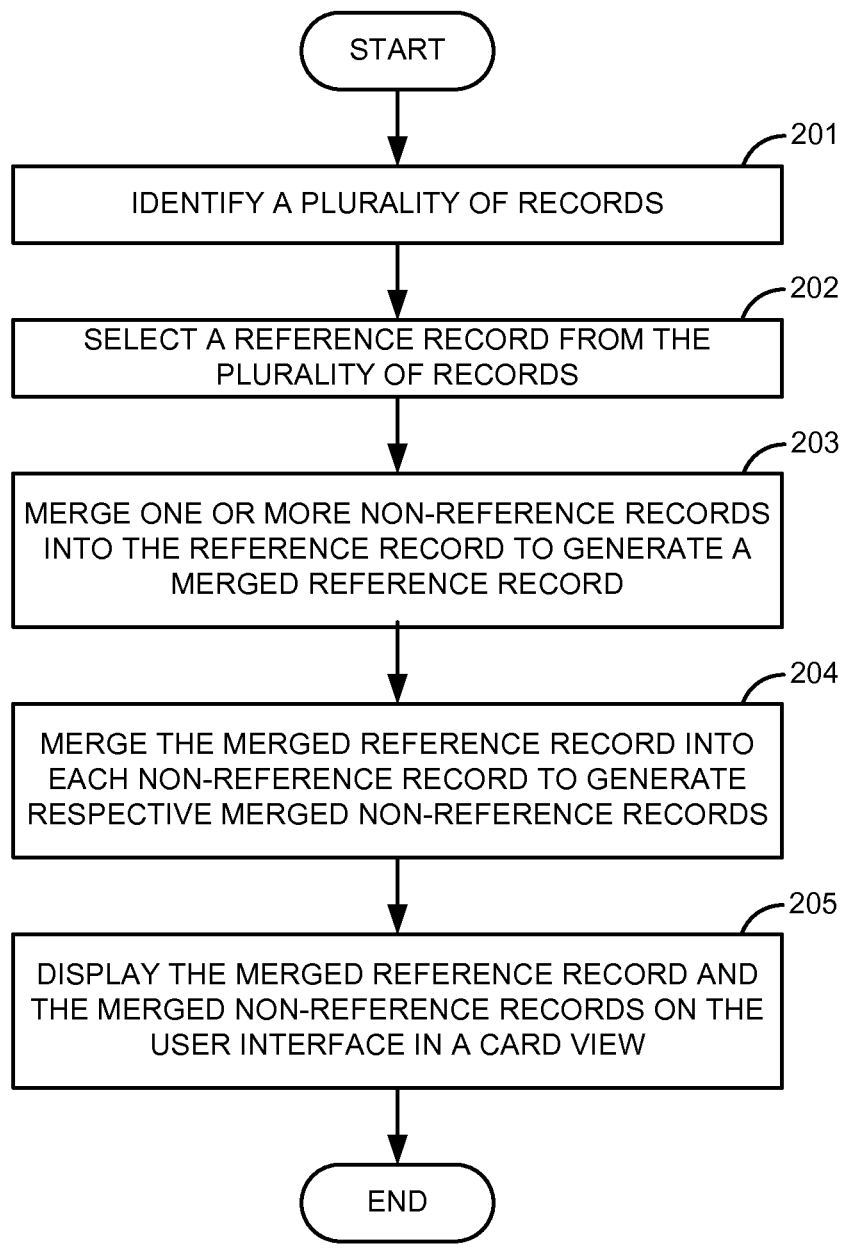
FIG. 2 is a flow chart illustrating the steps performed to align records for visual comparison, according to an embodiment of the invention.

FIG. 2 is a flowchart illustrating a method for aligning records for visual comparison, according to one embodiment. A plurality of records is identified at step 201. A reference record is selected from the plurality of records at step 202. In one embodiment, the reference record is selected randomly. In another embodiment, the reference record is selected based upon a predefined rule. In yet another embodiment, the reference record is selected based upon a user's input. One or more non-reference record is merged into the reference record to generate a merged reference record at step 203. In one embodiment, each non-reference record is merged into the reference record to generate the merged reference record. The merged reference record includes one or more fields missing in the reference record. In one embodiment, the fields of the reference record are compared to the fields of the non-reference records to determine the fields missing in the reference record. The missing fields are included into the merged reference record. The missing fields are included as blank fields. The merged reference record, therefore, is a superset that includes all the fields of all the records. The merged reference record is merged into each non-reference record to generate respective merged non-reference record at step 204. The merged non-reference records include fields missing in the respective non-reference records. The fields are included from the merged reference record as blank fields. In one embodiment, a position of an included blank field is determined based upon the position of the corresponding field in the merged reference record. The merged reference record and the merged non-reference records are aligned relative to each other. The merged records are displayed on a user interface (UI) in a card view at step 205. In the card view, the records are displayed side-by-side in a vertical arrangement.

Figure 3:
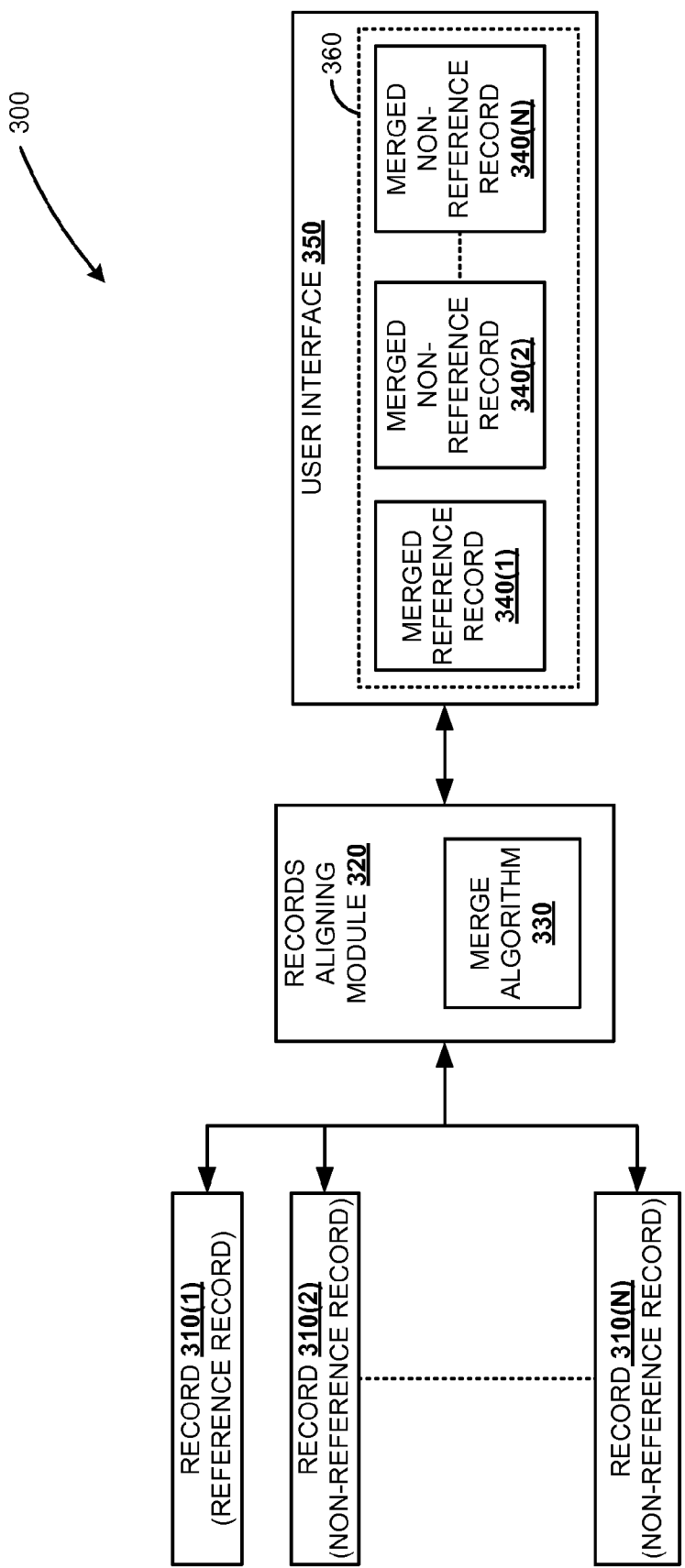
FIG. 3 is a block diagram of a system including a records aligning module to align records for visual comparison, according to an embodiment of the invention.

FIG. 3 illustrates one embodiment of a system 300 including a records aligning module 320 to align a plurality of records 310(1-N). The records 310(1-N) are identified by the records aligning module 320. The records aligning module 320 selects a record 310(1) as a reference record. The reference record 310(1) and non-reference records 310(2-N) are passed to a merge algorithm 330. The merge algorithm 330 merges one or more non-reference record 310(2-N) into the reference record 310(1) to generate a merged reference record 340(1). The merged reference record 340(1) may include one or more fields missing in the reference record 310(1). The fields are included from one or more non-reference records 310(2-N). In one embodiment, the fields of the reference record 310(1) are compared to the fields of each of the non-reference records 310(2-N) to determine the fields missing in the reference record 310(1). The missing fields are included into the reference record 310(1) from the corresponding one or more non-reference records 310(2-N) to generate the merged reference record 340(1). The missing fields are included as blank fields. The merged reference record 340(1) is, therefore, a superset that includes all the fields of all the records 310(1-N). The merged reference record 340(1) is merged into each of the non-reference record 310(2-N) to generate respective merged non-reference records 340(2-N). In one embodiment, the fields missing in the non-reference records 310(2-N) are determined. The missing fields are included into the corresponding non-reference records 310(2-N) to generate respective merged non-reference records 340(2-N). The fields are included from the merged reference record 340(1) as blank fields in positions where the fields are missing. In one embodiment, a position of an included blank field is determined based upon the position of the corresponding field in the merged reference record 340(1). Each merged record 340(1-N) include all the fields of all the records 310(1-N) and are aligned relative to each other. The merged records 340(1-N) are displayed on a user interface (UI) 350 in a card view 360. In the card view 360 the merged records 340(1-N) are positioned side-by-side in a vertical arrangement to enable efficient visual comparison.

A visual comparison task (e.g., match review task) may be assigned to a user. Typically, the user may require to match or compare the plurality of records 310(1-N). The records 310(1-N) may be misaligned. The misaligned records 310(1-N) are required to be aligned so that they can be easily compared. For example, the records 310(1-N) are required to be aligned such that like fields (data) of the records 310(1-N) line up in a same row.

The records 310(1-N) include various fields. For example, the record 310(1) for a 'customer' may include fields, e.g., a first name, a middle name, a last name, a contact number, etc. The like fields of the records 310(1-N) are required to be compared. For example, the fields 'first name,' 'middle name,' and 'last name' of the record 310(1) are required to be compared with the corresponding fields 'first name,' 'middle name,' and 'last name' of the record 310(2). Typically, the fields of the records 310(1-N) are required to be aligned properly so that the like fields of the records 310(1-N) line up in a same row and the records 310(1-N) can be easily compared.

The records 310(1-N) may be identified by the records aligning module 320. The records aligning module 320 aligns the records 310(1-N) relative to each other. For aligning the records 310(1-N), the records aligning module 320 selects the reference record 310(1). In one embodiment, the reference record 310(1) is randomly selected. In another embodiment, the reference record 310(1) is selected based upon a predefined rule. For example, the predefined rule may be: "a first record from the plurality of records has to be selected as the reference record." Based upon the predefined rule the first record 310(1) may be selected as the reference record. In yet another embodiment, a master record is selected as the reference record. The master record may be the record selected by the user from the records 310(1-N). For example, the user may select the record 310(1) as the master record. The master record 310(1) may be selected as the reference record. Once the reference record 310(1) is selected, the records 310(1-N) may be passed to the merge algorithm 330.

In one embodiment, the merge algorithm 330 is a separate entity communicatively coupled to the records aligning module 320. In another embodiment, the merge algorithm 330 is a part of the records aligning module 320, as illustrated in FIG. 3. The merge algorithm 330 receives the records 310(1-N). The merge algorithm 330 identifies the reference record 310(1). The merge algorithm 330 merges the one or more non-reference records 310(2-N) into the reference record 310(1) to generate the merged reference record 340(1). In one embodiment, the merge algorithm 330 merges each non-reference records 310(2-N) into the reference record 310(1) to generate the merged reference record 340(1).

The merged reference record 340(1) includes the one or more fields missing in the reference record 310(1). The one or more missing fields are included from the one or more non-reference records 310(2-N). The fields are included as blank fields. In one embodiment, the fields of the reference record 310(1) are compared to the fields of each of the non-reference records 310(2-N) to determine the fields missing in the reference record 310(1). The missing fields are included into the reference record 310(1) to generate the merged reference record 340(1). The merged reference record 340(1), therefore, is the kind of superset that includes all the fields of all the records 310(1-N). In one embodiment, an order or position of the included blank field in the merged reference record 340(1) may be determined based upon a predefined template or a predefined rule. In another embodiment, the order of the included blank field in the merged reference record 340(1) may be determined arbitrary.

Once the merged reference record 340(1) is generated, the merged reference record 340(1) is merged into each non-reference record 310(2-N). When the merged reference record 340(1) is merged into each non-reference record 310(2-N), the respective merged non-reference records 340(2-N) are generated. The merged non-reference records 340(2-N) may include one or more fields missing in the corresponding non-reference records 310(2-N). For example, the merged non-reference record 340(2) may include the one or more fields missing in the non-reference record 310(2). The fields are included as the blank fields in the positions where the fields are missing. Typically, a value of the blank field is blank.

In one embodiment, the fields of each non-reference record 310(2-N) are compared to the fields of the merged reference record 340(1) to determine the one or more fields missing in the one or more non-reference records 310(2-N). The missing fields are included into the merged non-reference records 340(2-N) from the merged reference record 340(1). The fields are included as the blank fields in position where the fields are missing. In one embodiment, the merged reference record 340(1) is used as a template for determining the order or position of the included blank field. The order of the blank field in the merged non-reference records 340(2-N) is determined based upon the order of the corresponding field in the merged reference record 340(1). The merged reference record 340(1) and the merged non-reference records 340(2-N) are aligned relative to each other.

In below exemplary embodiment, the merging operation is illustrated for aligning the two records 310(1-2). The exemplary records 310(1-2) are illustrated below with the record 310(1) as the reference record and the record 310(2) as the non-reference record. The record 310(1) and the record 310(2) are shown below in table 1 and table 2, respectively.

TABLE 1

| Name | A |
|---|---|
| Name ID | y |

TABLE 2

| Name | A |
|---|---|
| Contact ID | x |
| PAN No. | ABC |

The non-reference record 310(2) is merged into the reference record 310(1). As a result of merging, the merged reference record 340(1) is generated as shown in table 3 below:

TABLE 3

| Name | A |
|---|---|
| Name ID | y |
| Contact ID | |
| PAN No. | |

As shown, the merged reference record 340(1) includes the fields 'contact ID' and 'Pan no' that are missing in the reference record 310(1). The missing fields are included into the merged reference record 340(1) from the non-reference record 310(2). The fields are included as the blank fields, i.e., the value of the fields 'contact ID' and "Pan no" is blank or empty.

The merged reference record 340(1) is merged into the non-reference record 310(2). As a result of merging, the merged non-reference record 340(2) is generated as represented in table 4 below:

TABLE 4

| Name | A |
|---|---|
| Name ID | |
| Contact ID | x |
| PAN No. | ABC |

As shown, the merged non-reference record 340(2) includes the field 'name ID' missing in the non-reference record 310(2). The field is included from the merged reference record 340(1). The field is included as the blank field, i.e., the value of the included field 'Name ID' is empty or blank. In one embodiment, the order or position of the included blank field (Name ID) is determined based upon the order or position of that field (Name ID) in the merged reference record 340(1). For example, as the field 'Name ID' is a second field of the merged reference record 340(1), therefore, the field 'Name ID' (included as blank field in the merged non-reference record 340(2)) is also included as the second field in the merged non-reference record 340(2).

The merged records 340(1-2), i.e., the merged reference record 340(1) (illustrated in below table 1) and the merged non-reference record 340(2) (illustrated in below table 2) are aligned relative to each other such that the like fields line up in the same row, as shown in table 5 and 6 below:

TABLE 5

| Name | A |
|---|---|
| Name ID | y |
| Contact ID | |
| PAN No. | |

TABLE 6

| Name | A |
|---|---|
| Name ID | |
| Contact ID | x |
| PAN No. | ABC |

Figure 4:
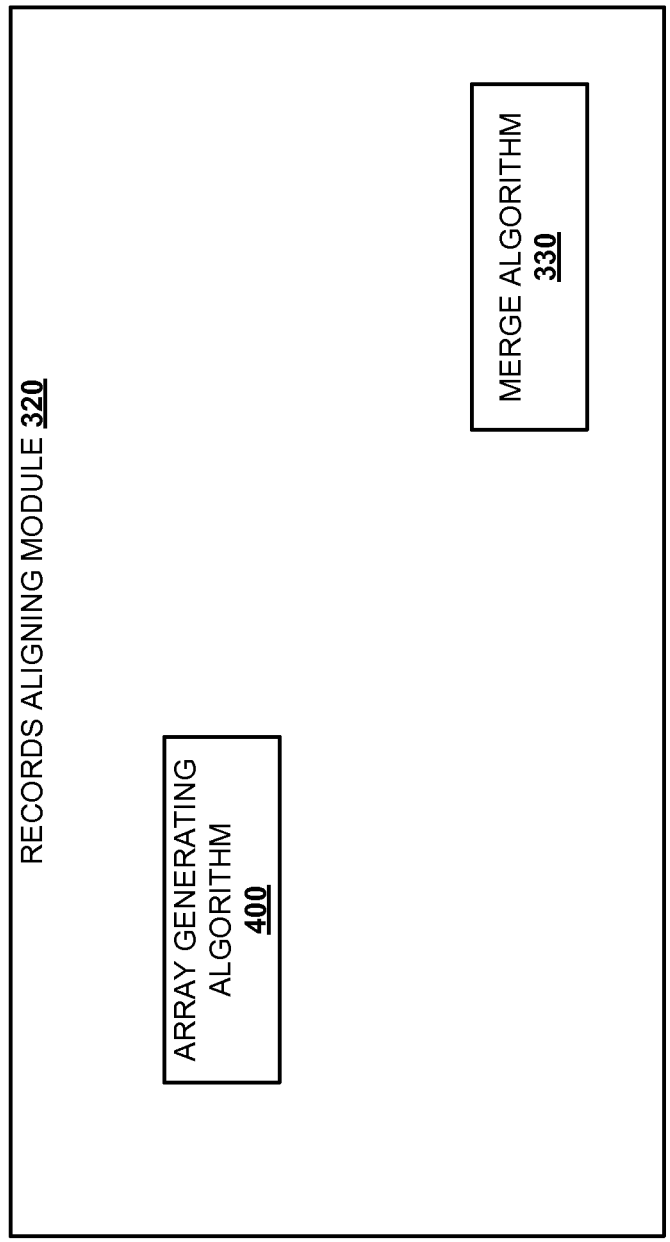
FIG. 4 illustrates a block diagram of the records aligning module, according to an embodiment of the invention.

In one embodiment, the merging operation is performed using an array representation of the records 310(1-N). The array representation of the records 310(1-N) may be generated by an array generating algorithm 400 (FIG. 4). In one embodiment, the array generating algorithm 400 may be a part of the records aligning module 320, as illustrated in FIG. 4. In another embodiment, the array generating algorithm 400 may be a separate entity communicatively coupled to the records aligning module 320.

The records aligning module 320 passes the records 310 (1-N) to the array generating algorithm 400. The array generating algorithm 400 traverse each record 310(1-N) to generate an array representation (not shown) of each record 310 (1-N). In one embodiment, if the record is hierarchical (e.g., XML records), the array generating algorithm 400 traverse a tree structure of the hierarchical record to generate the array representation of the hierarchical record. The array generating algorithm 400 traverse each node of the tree structure to generate the array representation of the hierarchical record. In one embodiment, the tree structure may be a linked list structure stored in a memory.

The generation of the array representation for an exemplary reference record 310(1) (shown in below table 7) and the exemplary non-reference record 310(2) (shown in below table 8) is described below.

TABLE 7

| Customer   | A   |
| First Name | xyz |
| Last Name  | abc |

TABLE 8

| Customer    | A    |
| First Name  | xyz1 |
| Middle Name | pqr1 |
| Last Name   | abc1 |

For generating the array representation of the exemplary record 310(1), the array generating algorithm 400 traverses through a tree structure 500A (FIG. 5) corresponding to the reference record 310(1). Each node (510, 520, 520A, and 520B) of the tree structure 500A is traversed to retrieve the information related to the root node 510 and the one or more descendants (520, 520A, and 520B). As shown in FIG. 5, the tree structure 500A starts with a root node (default node) 510. The customer may be a child node (i.e., the customer node 520) of the root node 510. Similarly, the 'first name' and the 'last name' may be child nodes 520A and 520B, respectively, of the customer node 520. In one embodiment, the information associated with a node may include one of a name of the node, a number of child nodes associated with the node, a name of a parent node, an occurrence number of the node, properties related to the node representing if the node is hidden or masked, a value of the node, a child index of the node representing if the node is $n^{th}$ child of the parent node (n being a natural number), and one or more comments related to the node.

Based upon the retrieved information of each node (510, 520, 520A, and 520B), the array generating algorithm 400 generates an Array Representation #1 for the record 310(1) as presented below:

```
public var diffArr1:ArrayCollection = new ArrayCollection([
{ name:"root", childIdx:"0" children:1, parentName:"", occurNum:"1",
parentName:"", hidden:"", masked:"", value:"" },
{ name:"Customer", childIdx:"1", children:2, comment:"",
duplicate:"true", groupNum:"1", hidden:"", masked:"", match_score:"",
parentName: "root", occurNum:"1", recordId:"1", suspect:"false",
value:"" },
{ name:"FirstName", childIdx:"1", children:0, parentName:"Customer",
occurNum:"1", value:"xyz" },
{ name:"LastName", childIdx:"2", children:0, parentName:"Customer",
occurNum:"1", value:"abc" },
]);
```

Each node (510, 520, 520A, and 520B) of the tree structure 500A is recursively visited to enter information related to the 'root node' 510 and the descendants nodes (customer node 520, first name node 520A, and last name node 520B) into the Array Representation #1.

In the above shown array representation #1, "Name" indicates the name of the node. For example, the name of the node may be 'root,' 'customer,' 'first name,' and 'last name.'

"ChileIdx" represents that the node is $n^{th}$ child of its parent nodes. For example, the ChildIdx of the 'root' node 510 is '0' as the 'root' node 510 is not a child of any node, i.e., there is no parent node of the 'root' node 510. The ChildIdx of the 'customer' node 520 is '1' as the customer is $1^{st}$ child of its parent node (root node 510). Similarly, the ChildIdx of the 'first name' node 520A is '1' and the ChildIdx of the 'last name' node 520B is '2' as the 'first name' node and the 'last name' node are $1^{st}$ and $2^{nd}$ child of their parent node (customer node 520).

"Children" indicates number of child nodes associated with the node. For example, the children of root node 510 is '1' as the 'root' node has one child (customer node 520), the children of customer node 520 is '2' as the 'customer' node has two children (first name node 520A and last name node 520B), and the children of 'first name' node 520A and the 'last name' node 520B is '0' as they both do not have any children.

"Parent Name" represents the name of the parent node. For example, the parent name of the 'root' node 510 is empty as the 'root' node has no parent. The parent name of the 'customer' node 520 is 'root.' Similarly, the parent name of the 'first name' node 520A and the 'last name' node 520B is 'customer.'

"Value" indicates the value of the node. For example, the value of the 'root' node 510 is empty as the root node has no value. Similarly, the value of the 'first name' node 520A is 'xyz' and the value of the 'last name' node 520B is 'abc.'

"OccurNum" represents the number of occurrence of the node. It represents that the node is occurred n times (n being the natural number). For example, if a record includes three addresses for the customer (i.e., the nodes representing the three addresses would have the same name (address) and share the same parent 'customer') then each address node would be assigned an OccurNum 1, 2, and 3, respectively. Typically, the OccurNum is incremented each time the node with a same name and a same parent node is found.

"Comments" shows comments related to the node.

In one embodiment, the descendant node, e.g., the customer node 520 representing the record 310(1) also includes the additional information or attributes related to the record as described in paragraphs 0056-0062.

"Hidden" indicates that the value of the node or field is hidden. The hidden field may be illustrated as blank field. Typically, the value of the hidden field is displayed to only one or more authorized users and is not displayed to other (unauthorized) users. If the field is 'hidden' then the value of the field is not displayed.

"Masked" indicates that the value of the node or field is masked (obscured). The value of the masked field is not visible instead some symbols (e.g., *****) may be displayed to represent that it has masked value. For example, the sensitive data such as the value of a credit card number or the user's password may be masked. A number of characters in the symbol illustrating the sensitive data should match the number of characters in the sensitive data. For example, if the sensitive data includes four characters 'abcd,' then the symbol illustrating the sensitive data 'abcd' should also include four '*' character, i.e., the symbol should be '****.'

"RecordId" is an unique identifier of the record. The RecordId uniquely identify the record in a match group. The match group comprises similar records that fulfill certain match criteria. Alternately, the match group comprises the records that are filtered based upon certain match criteria. For example, the match group comprises the records that are filtered based upon the value of the one or more fields. The match criteria may be for filtering all records having 'first name' equals to 'x.' The match criteria may be specified by the user. The filtered records form the match group.

"GroupNum" represents the group number of the match group to which the record belongs.

"Duplicate" represents if the record is 'duplicate' relative to the master record in the match group. The record is considered 'duplicate' if the record matches the master record to certain extent based upon the match criteria. The duplicate field may be set to 'true' or 'false.' If the duplicate is 'true,' the record is considered duplicate relative to the master record in the group. If the duplicate is 'false,' the record is considered as non-duplicate. The user may set the record as non-duplicate if the user considers that the record does not match the master record to the certain extent based upon the match criteria.

"Match_score" indicates how much the record matches to the master record selected by the user. For example, it may be 60%, 90%, etc.

"Suspect" indicates a Boolean value (YES or NO) that represents if the record is a suspect record or not. The suspect record is a record that has a match score (e.g., match_score) within a predefined range. The suspect record is required to be reviewed by the user.

Similarly, the array generating algorithm 400 traverse the tree structure 500B (FIG. 5) of the non-reference record 310 (2) to retrieve information related to each node of the tree structure 500B to generate the below array representation #2 for the record 310(2):

```
public var diffArr1:ArrayCollection = new ArrayCollection([
{ name:"root", childIdx:"0" children:1, parentName:"", occurNum:"1",
parentName:"", hidden:"", masked:"", value:"" },
{ name:"Customer", childIdx:"1", children:3, comment:"",
duplicate: "true", groupNum:"1", hidden:"", masked:"", match_score:"",
parentName: "root", occurNum:"1", recordId:"1", suspect:"false",
value:"" },
{ name:"FirstName", childIdx:"1", children:0, parentName:"Customer",
occurNum:"1", value:"xyz1" },
{ name:"MiddleName", childIdx:"2", children:0, parentName:"Customer",
occurNum:"1", value:"pqr1" },
{ name:"LastName", childIdx:"3", children:0, parentName:"Customer",
occurNum:"1", value:"abc1" },
]);
```

In the above array representation, the "root" corresponds to the root node 510, "customer" corresponds to a customer node 530, "FirstName" corresponds to a first name node 530A, "MiddleName" corresponds to a middle name node 530B, and "LastName" corresponds to a last name node 530C.

Once the array representations of the records 310(1-2) are generated, the Array Representation #2 of the non-reference record 310(2) is merged into the Array Representation #1 of the reference record 310(1) to generate a merged array representation of the reference record 310(1), as presented below:

```
public var diffArr1:ArrayCollection = new ArrayCollection([
{ name:"root", childIdx:"0" children:1, parentName:"", occurNum:"1",
parentName:"", hidden:"", masked:"", value:"" },
{ name:"Customer", childIdx:"1", children:3, comment:"",
duplicate:"true", groupNum:"1", hidden:"", masked:"", match_score:"",
parentName:"root", occurNum:"1", recordId:"1", suspect:"false",
value:"" },
{ name:"FirstName", childIdx:"1", children:0, parentName:"Customer",
occurNum:"1", value:"xyz" },
{ name:"MiddleName", childIdx:"2", children:0, parentName:"Customer",
occurNum:"1", value:"_" },
{ name:"LastName", childIdx:"3", children:0, parentName:"Customer",
occurNum:"1", value:"abc" },
]);
```

The merged array representation of the reference record 310(1) includes the field "middle name" that is missing in the array representation of the reference record 310(1). In one embodiment, while merging, the fields of the Array Representation #1 are compared to the fields of the Array Representation #2 to determine the fields missing in the Array Representation #1. For example, it may be determined that the Array Representation #2 has the field "middle name" that is missing in the Array Representation #1. The missing field is added as the blank field in the Array Representation #1 to generate the merged array representation of the reference record 340(1). The value of the blank field is blank. For example, as shown in the merged array representation, the value of the included field "middle name" is blank (underlined in above merged array representation).

Based upon the addition of the missing field (e.g., Middle name), the ChildIdx and the Children information in the merged array representation are updated. For example, as shown in the merged array representation of the reference record 310(1), the ChildIdx and the Children information are updated. The updated ChildIdx and the Children information are underlined in the above merged array representation for reference.

In one embodiment, the merge algorithm 400 may execute the following merge operations to merge the array representation of one record into another, e.g., to merge the Array Representation #2 (secondCardArray) into the Array Representation #1 (firstCardArray):

Merge Operation: MergeCard2IntoCard1 (firstCardArray, secondCardArray).

When the operation MergeCard2IntoCard1 (firstCardArray, secondCardArray) is executed, the secondCardArray (Array Representation #2) is merged into firstCardArray (Array Representation #1) to generate the merged array representation (MergedfirstCardArray) of the reference record 310 (1).

The MergedfirstCardArray is merged into the secondCardArray (Array Representation #2) using the below merge operation to generate the merged array representation of the non-reference record 310(2).

Merge Operation: MergeCard2IntoCard1 (secondCardArray, MergedfirstCardArray).

Similarly, if there are three records (cards) the merge algorithm 400 may execute the merge operations (i) MergeCard2IntoCard1(firstCardArray, secondCardArray), (ii) MergeCard2IntoCard1(firstCardArray, thirdCardArray), (iii) MergeCard2IntoCard1(secondCardArray, MergedfirstCardArray), and (iv) MergeCard2IntoCard1(thirdCardArray, MergedfirstCardArray). The firstCardArray represents the array representation of the reference record, the secondCardArray represents the array representation of the non-reference record 1, the thirdCardArray represents the array representation of the non-reference record 2, and the MergedfirstCradArray represents the merged array representation of the reference record.

The array representation of the non-reference records (secondCardArray and thirdCardArray) are merged into the array representation of the reference record (firstCardArray) using the operation (i) and (ii). The merging results in generation of the merged array representation of the reference record (MergedfirstCardArray). The MergedfirstCardArray is then merged into the array representation of the non-reference records (secondCardArray and thirdCardArray), using the operations (iii) and (iv), to generate the respective merged array representation of the non-reference records. The merged array representation of the records (MergedfirstCardArray, MergedsecondCardArray, and MergedthirdCardArray) are aligned relative to each other.

In one embodiment, based upon the merged array representations of the records 310(1-N), the merged records 340(1-N) are generated. The merged records 340(1-N) may be in the XML format. In another embodiment, based upon the merged array representation of the records 310(1-N), the merged records 340(1-N) are generated in a suitable format that can be displayed on the UI 350.

The merged records 340(1-N) are displayed on the UI 350. The merged records 340(1-N) are displayed in the card view 360. In the card view 360, the merged records 340(1-N) are positioned side-by-side or adjacent to each other in a vertical arrangement. In one embodiment, the merged reference record 340(1) is displayed at an extreme left in the card view 360. In one embodiment, the merged master record may be displayed at the extreme left in the card view 360. For example, if the user selects the record 310(1) as the master record then the merged master record 340(1) may be displayed at the extreme left in the card view 360. The master record 310(1) is the record against which the other records 310(2-N) are required to be compared. In other embodiments, the left side is replaced with the right side.

While displaying the merged records 340(1-N) on the UI 350, the blank fields included due to merging are highlighted with a predefined color. If a plurality of consecutive blank fields are added as a result of merging then the consecutive blank fields are highlighted with a different shades of the predefined color. In one embodiment, the consecutive blank fields are highlighted such that alternate blank fields have a same shade of the predefined color.

The below paragraphs describe aligning two exemplary records and displaying the aligned records on the user interface 350. The exemplary records may be records 600A and 600B (illustrated in FIG. 6) that are required to be aligned. The record 600A being the reference record and the record 600B being the non-reference record. The non-reference record 600B is merged into the reference record 600A to generate the merged reference record 700 (FIG. 7). The merged reference record 700 is merged into the non-reference record 600B to generate the merged non-reference record 800 (FIG. 8). The merged records 700 and 800 are aligned relative to each other.

As shown in FIG. 7, the merged reference record 700 includes fields (620B, 620H1, 620H11, 620H12, 620H2, and 620H21) that are missing in the reference record 600A. The missing fields (620B, 620H1, 620H11, 620H12, 620H2, and 620H21) are included from the non-reference record 600B as blank fields. The blank fields (620B, 620H1, 620H11, 620H12, 620H2, and 620H21) are highlighted with a predetermined color while rendering the record 700 on the UI 350. Further, the plurality of consecutive blank fields 620H1, 620H11, 620H12, 620H2, and 620H21 (added as a result of merging) are highlighted with different shades of the predefined color while rendering the record 700 on the UI 350. The consecutive blank fields 620H1, 620H11, 620H12, 620H2, and 620H21 are highlighted such that the alternate blank fields (620H1, 620H12, and 620H21) or (620H11 and 620H2) have the same shade of the predefined color.

As illustrated in FIG. 8, the blank fields included due to merging (e.g., the fields 620H1, 620H11, 620H12, 620H2, and 620H21) in the record 700 are highlighted (illustrated as hashed fields and dotted fields). As the fields 620H1, 620H11, 620H12, 620H2, and 620H21 are consecutive fields, the fields are highlighted with different shades of the predefined color such that the alternate blank fields (620H1, 620H12, and 620h21) have the same shade of the predefined color (illustrated as dotted fields). Further, the alternate fields (620H11 and 620H2) have the same shade of the predefined color (illustrated as hashed fields).

Similarly, the fields included due to merging (e.g., the fields 610T, 610F, and 610E) in the record 800 are highlighted (illustrated as hashed fields and dotted fields). In one embodiment, the included blank fields 610T, 610F, and 610E are highlighted with the predefined color. As the fields 610T, 610F, and 610E are consecutive fields, the fields may be highlighted with different shades of the predefined color such that the alternate blank fields (610T and 610E) have same shade of the predefined color (illustrated as hashed fields in FIG. 8).

In one embodiment, the blank fields 620H1 and 620H2 may be included at new level of hierarchy. For example, the fields '620H1' and '620H2' added as blank fields due to merging creates new level of hierarchy in the record 700. As illustrated in FIG. 8, the fields 620H12 and 620H2 are included at the new or additional hierarchical level in the merged record 700. The additional level of hierarchy is displayed on the UI 350 with an empty branch icon 710(A-B). The empty branch icons 710A and 710B are expandable and collapsible. The empty branch icon 710(A-B) is expanded or collapsed to display or hide one or more fields included within the additional level of hierarchy. For example, the empty branch icon 710A may be collapsed to hide the fields 620H11 and 620H12 included within the additional level of hierarchy 620H1.

In one embodiment, the UI 350 includes several enhancements to enable the user to improve the reviewing and comparing task. For example, the UI 350 includes a title column 810 (FIG. 8) prefixed to the merged reference record 700 positioned at the extreme left. In another embodiment, the horizontal positions are reversed and the position is on the right. As illustrated, the title column 810 includes names (first name, middle name, last name, address, street, house number, etc) corresponding to each field of the displayed records (700 and 800). For example, the "first name" is displayed corresponding to the fields 610A and 620A of the displayed records 700 and 800.

In one embodiment, the UI 350 includes status columns corresponding to each displayed non-master records 340(2-N). The status columns may be prefixed to the respective records 340(2-N). For example, considering the reference record 700 as the master record, the UI 350 includes the status column 910 (FIG. 9) prefixed to the non-master record 800.

The status column 910 includes status corresponding to each field of the non-master record 800. In one embodiment, the status column 910 includes a status icon to indicate 'match' or 'no-match' of the field value with the corresponding field value of the master record 700. For example, the status column 910 includes the icon 'o' to indicate 'match' and an icon 'x' to indicate 'no-match,' as illustrated in FIG. 9.

In one embodiment, the UI 350 includes a hide-and-show option (not shown). The hide-and-show option hides or shows a specified field or row corresponding to all the displayed records 340(1-N). In one embodiment, if any one of the displayed record is scrolled all other records are scrolled accordingly (i.e., synchronized scrolling). For example, if the record 340(1) is scrolled then all other displayed records 340(2-N) are also scrolled accordingly or concurrently. Similarly, if the field of any record, e.g., record 340(1), is selected then the corresponding fields of all other records, e.g., the records 340(2-N), are also selected automatically (i.e., synchronized selection).

In one embodiment, each displayed record 340(1-N) includes a drag-and-drop feature. The drag-and-drop feature enables the user to drag a field within the record. For example, the user may select the field '620C' of the record 800 and drags the selected field '620C.' The dragged field 620C is droppable within the same record 800 and on the same level of hierarchy from where the field 620C is dragged. For example, the field 620C may be dropped in position of 620B within the record 800. In one embodiment, if the user attempts to drop the field 620C on different level of hierarchy, e.g., on field 620H1, then either an error message is displayed or there is a failure in dropping the field.

In one embodiment, the resultant records 340(1-N) rendered on the UI 350 include the "match_score" field denoted the match score. For example, as illustrated in FIG. 9, the records 700 and 800 include the match_score field 920A and 920B, respectively. The match_score 920(A-B) indicates a percentage of match of the record with the master record. For example, if the user selects the record 700 as the master record then the match_score 920B of the record 800 shows the percentage of match of the record 800 with the master record 700. In one embodiment, if the match_score 920B of the record 800 is above a predefined maximum value (e.g., 90%), the record 800 is approved and is not required to be manually reviewed. In one embodiment, if the match_score 920B is below a predefined minimum value (e.g., 45%) the record 800 is discarded. In another embodiment, if the match_score 920B is in between the predefined minimum value and the predefined maximum value (e.g., in between 45% and 90%), the record 800 is a suspected record that is required to be reviewed manually. In yet another embodiment, the match_score 920A of the master record 700 may be empty (blank). In one embodiment, based upon the drag-and-drop operation, the match_score 920B of the non-master record 800 is updated. In another embodiment, the match_score 920B may be updated based upon triggering the hide and show option.

In one embodiment, the non-master records 340(2-N) includes a suspect flag. For example, the non-master record 800 includes a suspect flag 930. The suspect flag 930 indicates if the record 800 is a suspected record. In one embodiment, the record 800 is the suspected record if its match_score 930B is within a predefined range, e.g., more than the minimum predefined value and less than the maximum predefined value. The suspected record 800 is required to be reviewed. In another embodiment, a background of the suspected record may be highlighted with another predefined color (not illustrated) while displaying the record on the UI 350.

In one embodiment, if the merging is not performed successfully, the original records 310(1-N) are displayed on the UI 350 in the card view. If the merging is not performed successfully, the records 310(1-N) may be unaligned in the card view. In another embodiment, if the merging is not performed successfully, an error message may be displayed on the UI 350.

In one embodiment, the merged array representation includes some markers. A marker (e.g., a counter) may help in highlighting the fields while converting the array representation into the XML record. In another embodiment, the array representation may include the markers to indicate that the value of the field in the merged non-master record is different from the value of the corresponding field in the merged master record. If the value of the field in the merged non-master record is different from the value of the corresponding field in the merged master record, the field(s) of the merged non-master record may be highlighted with a specific predefined color while rendering the merged non-master record on the UI 350.

Figure 10:
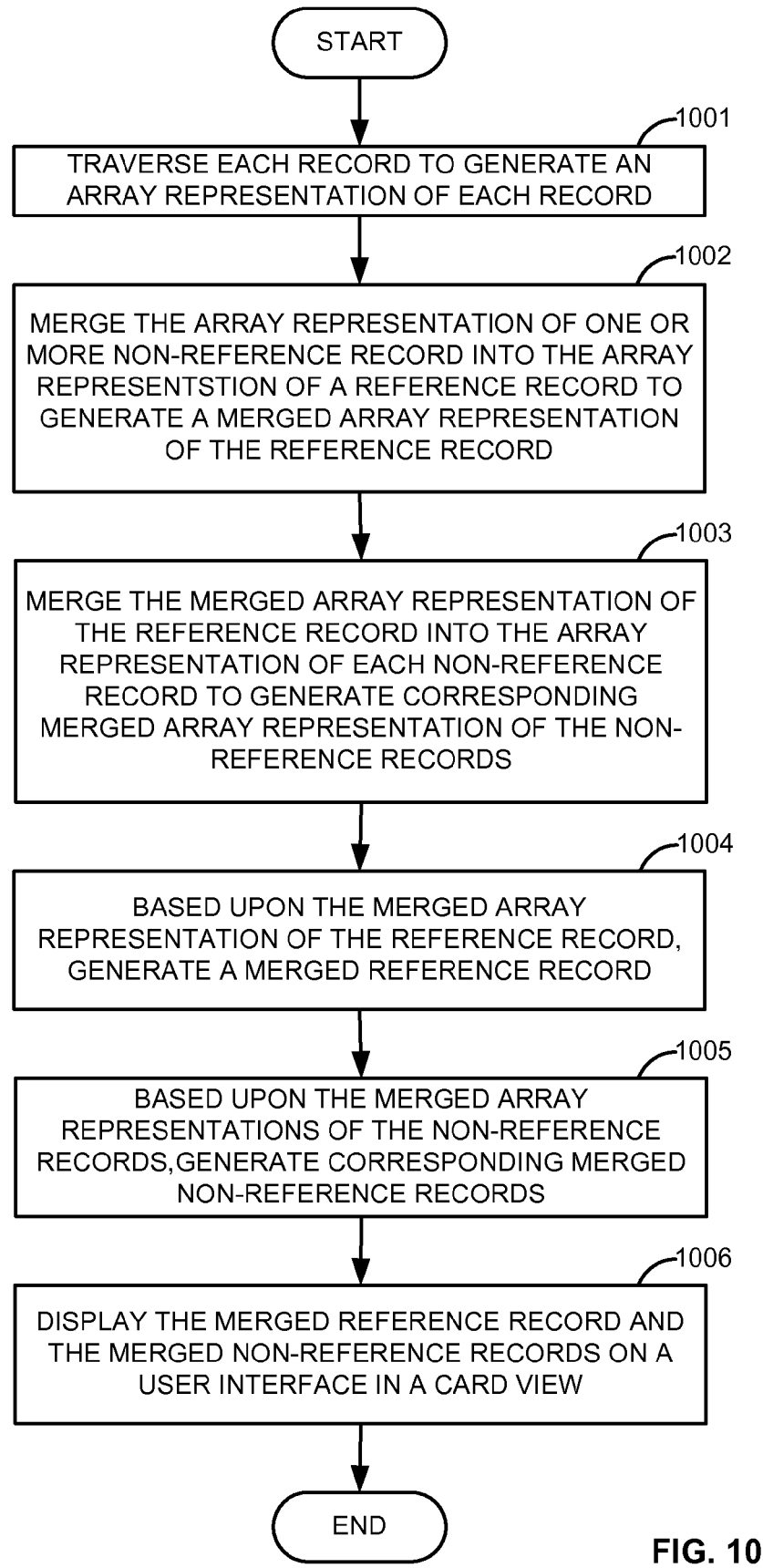
FIG. 10 is a flow chart illustrating the steps performed to align the records using array representations of the records, according to an embodiment of the invention.

FIG. 10 is a flowchart illustrating a method for aligning the records 310(1-N) using the array representation of the records 310(1-N), according to an embodiment of the invention. The array generating algorithm 400 traverse each record 310(1-N) to generate the array representation of each record 310(1-N) at step 1001. The array representation of the reference record 310(1) and the non-reference records 310(2-N) are generated. The array representation of the one or more non-reference record 310(2-N) is merged into the array representation of the reference record 310(1) to generate the merged array representation of the reference record 310(1) at step 1002. In one embodiment, the array representation of each non-reference record 310(2-N) is merged into the array representation of the reference record 310(1) to generate the merged array representation of the reference record 310(1). The merged reference record 340(1) is merged into the array representation of each non-reference record to generate the merged array representation of respective non-reference records 310(2-N) at step 1003. Based upon the merged array representation of the reference record, the merged reference record 340(1) is generated at step 1004. Similarly, based upon the merged array representation of the non-reference records 310(2-N), the merged non-reference records 340(2-N) are generated at step 1005. The merged records 340(1-N) may be the XML formatted records. The merged records 340(1-N) are aligned relative to each other. The merged record 340(1-N) are displayed on the UI 350 in the card view at step 1006.

Figure 11:
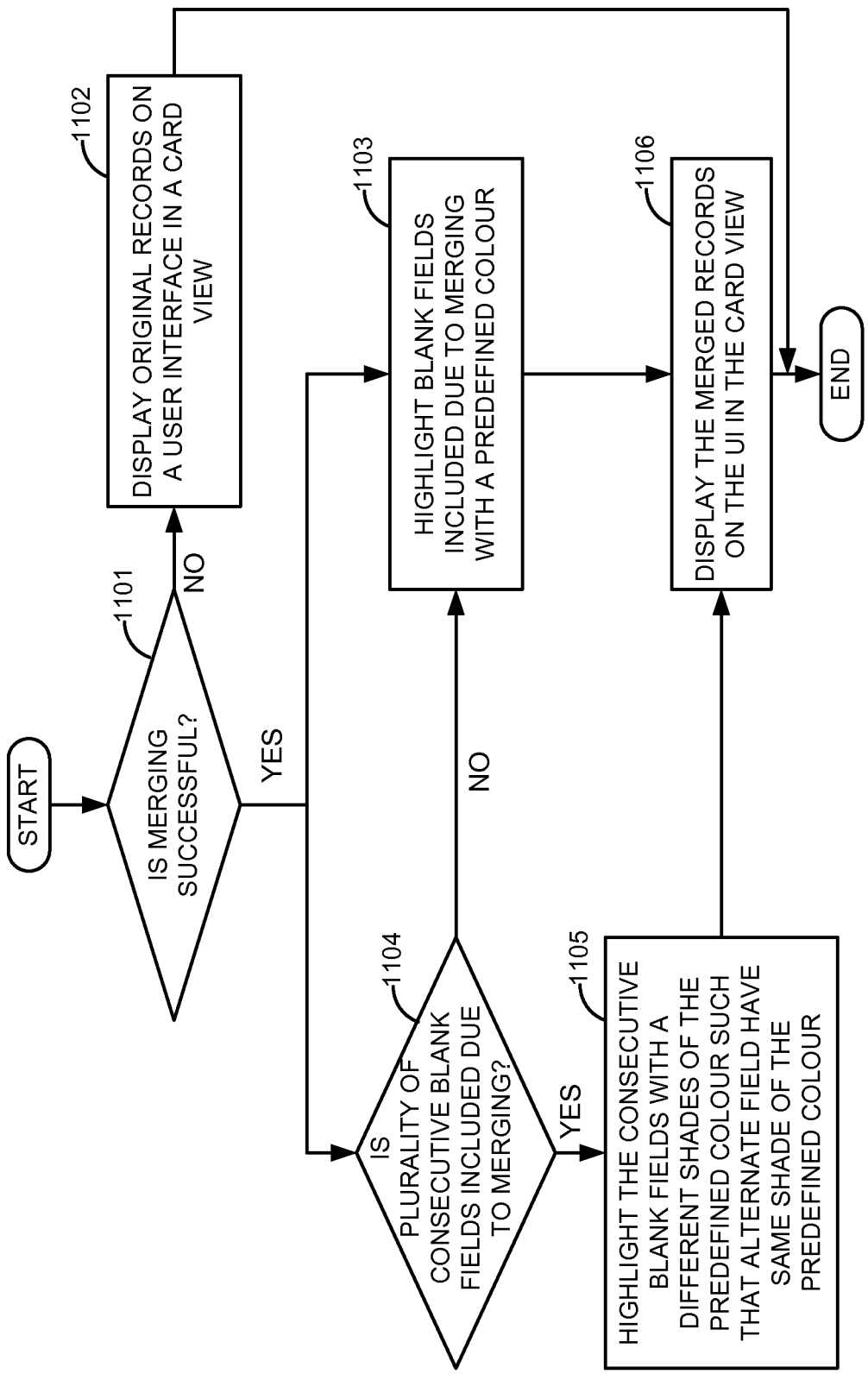
FIG. 11 is a flow chart illustrating the steps performed to display records based upon a result of the merging operation, according to an embodiment of the invention.

FIG. 11 is a flowchart illustrating a method for displaying records 310(1-N) based upon the merging operation. Once the merging operation is executed by the merge algorithm 330, it is determined if the merging is successful at step 1101. If the merging is unsuccessful (step 1101: NO), the original records 310(1-N) are displayed on the UI 350 in the card view at step 1102. The original records 310(1-N) may be misaligned. In one embodiment, if the merging is unsuccessful, the error message may be displayed on the UI 350. In case the merging is successful (step 1101: YES), the blank fields included due to merging are highlighted with the predefined color while rendering the merged record 340(1-N) on the UI 350 at step 1103. In one embodiment, if the merging is successful (step 1101: YES) it is determined if the plurality of consecutive blank fields are included due to merging at step 1104. In case the plurality of consecutive blank fields are included due to merging (step 1104: YES) the consecutive blank fields are highlighted with the different shades of the predefined color such that the alternate blank fields have the same shade of the predefined color at step 1105. The merged records 340(1-N) with highlighted fields are displayed on the UI 350 in the card view 360 at step 1106.

The embodiments described above provide techniques to align records. Filler rows (blank fields) are included or added in place of the missing data in each record to align the records relative to each other. The records are aligned such that the like data fields of the records line up in the same row. Further, rendering the aligned records in the card view enables a convenient and efficient comparison. Consequently, the user can perform a better visual scanning Moreover, the UI enhancements, e.g., the drag-and-drop feature, the background color highlighting, the status column, the title column, the suspect flag, etc., further improve the reviewing and comparing tasks. Additionally, the technique is flexible to adapt to various record formats and to any levels of hierarchy.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 12:
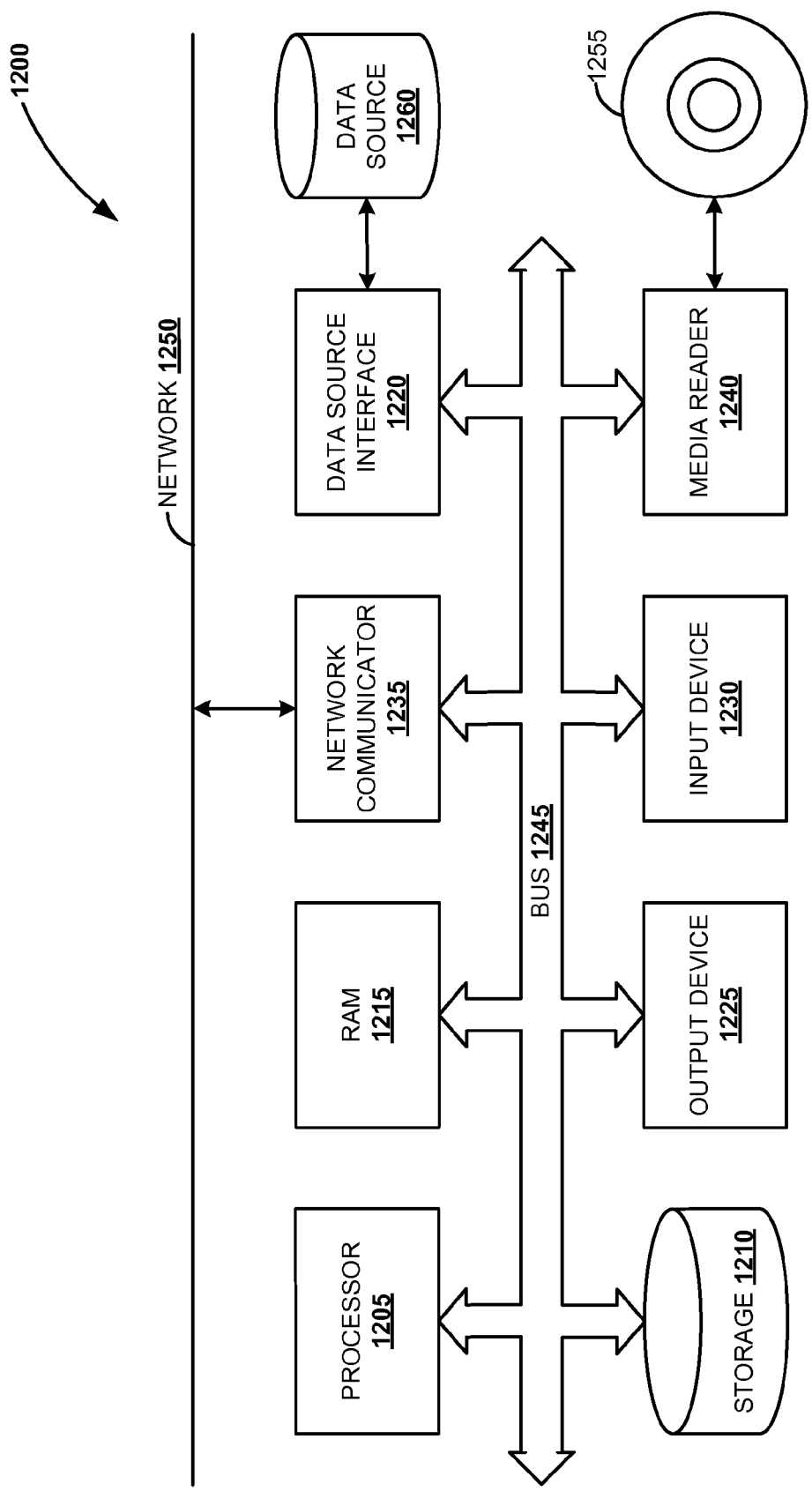
FIG. 12 is a block diagram of an exemplary computer system, according to an embodiment of the invention.

FIG. 12 is a block diagram of an exemplary computer system 1200. The computer system 1200 includes a processor 1205 that executes software instructions or code stored on a computer readable storage medium 1255 to perform the above-illustrated methods of the invention. The computer system 1200 includes a media reader 1240 to read the instructions from the computer readable storage medium 1255 and store the instructions in storage 1210 or in random access memory (RAM) 1215. The storage 1210 provides a large space for keeping static data where at least some instructions could be stored for later execution. The stored instructions may be further compiled to generate other representations of the instructions and dynamically stored in the RAM 1215. The processor 1205 reads instructions from the RAM 1215 and performs actions as instructed. According to one embodiment of the invention, the computer system 1200 further includes an output device 1225 (e.g., a display) to provide at least some of the results of the execution as output including, but not limited to, visual information to users and an input device 1230 to provide a user or another device with means for entering data and/or otherwise interact with the computer system 1200. Each of these output devices 1225 and input devices 1230 could be joined by one or more additional peripherals to further expand the capabilities of the computer system 1200. A network communicator 1235 may be provided to connect the computer system 1200 to a network 1250 and in turn to other devices connected to the network 1250 including other clients, servers, data stores, and interfaces, for instance. The modules of the computer system 1200 are interconnected via a bus 1245. Computer system 1200 includes a data source interface 1220 to access data source 1260. The data source 1260 can be accessed via one or more abstraction layers implemented in hardware or software. For example, the data source 1260 may be accessed by network 1250. In some embodiments the data source 1260 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system, e.g., an ERP system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, causes the computer to:
   identify a plurality of records;
   select a reference record from the plurality of records;
   merge one or more non-reference records into the reference record to generate a merged reference record, wherein the merged reference record includes one or more fields missing in the reference record and wherein the missing fields are included as blank fields in the merged reference record;
   merge the merged reference record into one or more non-reference records to generate respective one or more merged non-reference records, wherein a merged non-reference record includes one or more fields missing in a corresponding non-reference record and wherein the missing fields are included as the blank fields in the merged non-reference record in positions corresponding to the positions of the fields in the merged reference record;
   display the merged reference record and the merged non-reference record on a user interface in a card view, wherein the merged reference record and the merged non-reference record are aligned relative to each other;
   identify a master record, wherein the master record is a record selected by a user;
   identify a match score for each merged non-master record, wherein the match score of a merged non-master record indicates a percentage of match of the merged non-master record with a merged master record;
   identify a suspect flag for each merged non-master record indicating whether the merged non-master record is a suspected record that is required to be reviewed, wherein the merged non-master record is the suspected record when the match score of the merged non-master record is within a predefined range; and
   display the merged non-master records along with their respective match score and the suspect flag on the user interface.

2. The article of manufacture of claim 1 further comprising instructions which when executed cause the computer to:
   select the reference record based upon a predefined rule;
   select the reference record based upon a user's input;
   randomly select a record as the reference record; and
   select a master record as the reference record, wherein the master record is a record selected by the user from the plurality of records.

3. The article of manufacture of claim 1, wherein in the card view the merged reference record and the merged non-reference records are displayed side by side and wherein the merged reference record is displayed on a left side in the card view.

4. The article of manufacture of claim 1 further comprising instructions which when executed cause the computer to perform at least one of the following while displaying the merged records on the user interface:
   highlight the one or more blank fields included in the merged reference record and the merged non-reference record with a predefined color; and
   when the plurality of consecutive blank fields are included due to merging, highlight the consecutive blank fields with a different shade of the predefined color such that the alternate blank fields have the same shade of the predefined color.

5. The article of manufacture of claim 1 further comprising instructions which when executed cause the computer to:
   highlight a background of the suspected record with a predefined color while displaying the suspected record on the user interface; and
   highlight the field of the merged non-master record with another predefined color when the value of the field of the merged non-master record is different from the value of the corresponding field in the merged master record while displaying the merged non-master record on the user interface.

6. The article of manufacture of claim 1, wherein a blank field is included at a new level of hierarchy and wherein the new level of hierarchy is displayed with an empty branch icon which is expandable and collapsible to expand and collapse one or more blank fields included within the empty branch icon.

7. The article of manufacture of claim 1, wherein the user interface includes at least one of the following:
   a title column prefixed to the record placed on a left side in the card view, wherein the title column includes name corresponding to each field of the displayed records such that the name of each field is displayed against the respective field; and
   a status column prefixed to a displayed record, wherein the status column includes status icons indicating status of each field of the record and wherein a status icon indicates a match or no-match of a field of the record against the corresponding field of a master record selected by a user.

8. The article of manufacture of claim 1, wherein when a field in one of the displayed record is selected, a corresponding field in other displayed records are automatically selected and wherein when one of the displayed record is scrolled other displayed records are scrolled concurrently.

9. The article of manufacture of claim 1 further comprising instructions which when executed cause the computer to:
   traverse through each record to generate an array representation of each record;
   wherein merging each non-reference record into the reference record comprises merging the array representation of each non-reference record into the array representation of the reference record to generate the merged array representation of the reference record; and
   wherein merging the merged reference record into each non-reference record comprises merging the merged array representation of the reference record into the array representation of each non-reference record to generate the respective merged array representation of the non-reference records.

10. The article of manufacture of claim 9 further comprising instructions which when executed cause the computer to:

based upon the merged array representation of the reference record, generate the merged reference record; and based upon the merged array representations of the non-reference records, generate the corresponding merged non-reference records.

11. The article of manufacture of claim 9, wherein the array representation of a record is generated by:

identifying the record in a hierarchical topology with a root node and one or more descendants nodes of the root node; and traversing the hierarchical topology of the record to store information associated with the root node and the one or more descendants nodes in the array representation of the record.

12. The article of manufacture of claim 11 further comprising instructions which when executed cause the computer to:

based upon the merging, update the information associated with the root node and the one or more descendants nodes in the array representation of the record.

13. A computer-implemented method for aligning a plurality of records for visual comparison, the method comprising:

identifying a plurality of records;

selecting a reference record from the plurality of records;

merging one or more non-reference records into the reference record to generate a merged reference record, wherein the merged reference record include one or more fields missing in the reference record and wherein the missing fields are included as blank fields;

merging the merged reference record into one or more non-reference records to generate respective merged non-reference record, wherein the merged non-reference record includes one or more fields missing in corresponding non-reference record and wherein the missing fields are included as the blank fields in the merged non-reference record in positions corresponding to the positions of the fields in the merged reference record;

displaying the merged reference record and the merged non-reference records on a user interface in a card view, wherein the merged reference record and the merged non-reference record are aligned relative to each other;

identifying a master record selected by a user;

displaying the merged master record on a left side in the card view;

determining whether a value of a field of a merged non-master record is different from the value of the corresponding field in the merged master record;

when the value of the field in the merged non-master record is different from the value of the corresponding field in the merged master record, highlighting the field of the merged non-master record with a specific color;

determining whether the merged non-master record is a suspected record, wherein the suspected record is a record having a match score within a predefined range; and when the merged non-master record is the suspected record, highlighting a background of the suspected record with a predefined color while rendering the suspected record on the user interface.

14. The method of claim 13 further comprising:
determining whether the merging is successful;
when the merging is unsuccessful, displaying the plurality of records on the user interface in the card view; and
when the merging is successful, perform at least one of the following while displaying the merged records on the user interface:

highlight the one or more blank fields included in the merged reference record and the merged non-reference record with a predefined color; and when the plurality of consecutive blank fields are included due to merging, highlight the consecutive blank fields with a different shades of the predefined color such that the alternate blank fields have the same shade of the predefined color.

15. The method of claim 13 further comprising:
traversing each record to generate an array representation of each record;

merging the array representation of each non-reference record into the array representation of the reference record to generate a merged array representation of the reference record;

merging the merged array representation of the reference record into the array representation of each non-reference record to generate a merged array representation of respective non-reference records;

based upon the merged array representation of the reference record, generating the merged reference record; and based upon the merged array representation of the non-reference records, generating respective merged non-reference records.

16. A computer system for aligning records for visual comparison, comprising:

a memory to store program code; and a processor communicatively coupled to the memory, the processor configured to execute the program code to:
identify a plurality of records;
select a reference record from the plurality of records;
traverse through each record to generate an array representation of each record;

merge one or more non-reference records into the reference record to generate a merged reference record by merging the array representation of one or more non-reference record into the array representation of the reference record to generate a merged array representation of the reference record, wherein the merged reference record includes one or more fields missing in the reference record and wherein the missing fields are included as blank fields;

merge the merged reference record into one or more non-reference records to generate respective merged non-reference record by merging the merged array representation of the reference record into the array representation of the one or more non-reference record to generate the respective merged array representation of the non-reference records, wherein a merged non-reference record includes one or more fields missing in corresponding non-reference record and wherein the missing fields are included as the blank fields in the merged non-reference record in positions corresponding to the positions of the fields in the merged reference record;

based upon the merged array representation of the reference record, generate the merged reference record;

based upon the merged array representation of the non-reference records, generate the respective merged non-reference records; and display the merged reference record and the one or more merged non-reference records on a user interface in a card view, wherein the merged reference record and the merged non-reference record are aligned relative to each other.

17. The computer system of claim 16, wherein the processor is further configured to execute the program code to:
- determine whether the merging is successful;
- when the merging is unsuccessful, display the plurality of records on the user interface in the card view; and
- when the merging is successful, perform at least one of the following while displaying the merged records on the user interface:
  - highlight the one or more included blank fields with a predefined color;
  - determine whether a plurality of consecutive blank fields are included as a result of merging; and
  - when the plurality of consecutive blank fields are included, highlighting the consecutive blank fields with a different shades of the predefined color such that the alternate blank fields have the same shade of the predefined color.

* * * * *